United States Patent [19]
Alexander et al.

[11] Patent Number: 6,091,935
[45] Date of Patent: Jul. 18, 2000

[54] INTEGRATED CIRCUIT TRANSPORTER AND A METHOD OF COMMUNICATION THEREFOR

[75] Inventors: Sam Alexander; Lee Furey, both of Phoenix, Ariz.

[73] Assignee: Microchip Technology Incorporated, Chandler, Ariz.

[21] Appl. No.: 08/946,428

[22] Filed: Oct. 7, 1997

[51] Int. Cl.[7] .................................................. H04B 1/38
[52] U.S. Cl. ............................. 455/41; 455/73; 455/343
[58] Field of Search ............................... 455/41, 44, 73, 455/78, 80, 106, 38.1, 38.3, 343, 572, 573; 340/825.54, 825.69

[56] References Cited

U.S. PATENT DOCUMENTS 5,041,826  8/1991  Milheiser ................................... 455/41
5,905,449  5/1999  Tsubouchi et al. ....................... 455/78

*Primary Examiner*—Thanh Cong Le
*Attorney, Agent, or Firm*—Paul N. Katz; Ronald L. Chichester; Frohwitter

[57] ABSTRACT

An improved integrated circuit transponder device is presented comprising, in combination, a single, externally wireless package enclosing an integrated circuit semiconductor chip, a coil within the package being selectively exposed to an electromagnetic field, and a detection portion on the integrated circuit semiconductor chip and being coupled to each end of the coil for detecting when voltages at each end of the coil are approximately equal over a period of time. The detection portion includes an exclusive NOR gate coupled to each end of the coil for determining when the coil voltages are equal, and the output of the exclusive NOR gate is input to a filter before being delivered to the remainder of the device circuitry.

2 Claims, 2 Drawing Sheets

INTEGRATED CIRCUIT TRANSPORTER AND A METHOD OF COMMUNICATION THEREFOR

RELATED APPLICATIONS

This patent application is related to pending U.S. patent application entitled "A Single-Sided Package Including an Integrated Circuit Semiconductor Chip and Inductive Coil and Method Therefor," filed in the names of Joseph Fernandez and Lee Furey, and is incorporated herein by reference. This patent application is also related to pending U.S patent application entitled "Combination Inductive Coil and Integrated Circuit Semiconductor Chip in a Single Lead Frame Package and Method Therefor," filed in the names of Lee Furey and Joseph Fernandez, and is incorporated herein by reference.

BACKGROUND OF THE INVENTION

1. Field of the Invention

This invention is in the field of wireless radio frequency devices and methods of communication therefor and, more particularly, is an improved integrated circuit transponder device and a method of communication therefor.

2. Description of the Related Art

Integrated Circuits (hereafter "ICs") are, of course, well known to those skilled in the art of electrical engineering. Typically, one will have a plurality of ICs and other electronic components interconnected to form an electrical system for performing one or more functions. In most electrical systems, ICs are physically connected by way of a number of external conductors such as wires, thereby permitting each IC to communicate with different ICs or other electronic components in the system. Alternatively, those skilled in the art are familiar with methods of communicating with ICs without the use of interconnecting, external conductors such as wires.

In particular, one could form electronic packages enclosing both an IC die and an inductive coil with the IC's encapsulating material. These packages would have no conductors running externally from the package for the purpose of communicating with ICs or other electronic components outside of these packages. Such an externally wireless package encapsulates both the IC die having the chip logic, and the inductive coil, which is internally coupled to the IC die. The internal inductive coil of an externally wireless package generally serves two primary functions. First, when an electromagnetic field is applied through the package from an external source such as an external electromagnetic transmission source, a potential is created across the internal inductive coil, and this potential provides current to power the internals of the package. Second, the inductive coil serves essentially as an antenna for transmitting from and/or receiving information for the package internals. Such externally wireless packages may be referred to as transponders, meaning that they can both transmit and receive information.

Oftentimes, transponders are referred to as "tags." The term of art, tag, generally refers to externally wireless electronic packages that are affixed or "tagged" onto merchandise, luggage, or any one of a number of other objects where item identification is required. It should be pointed out that tags are not only used for item identification; they may also be used to rapidly report the state of some parameter regarding a particular item. For example, a tag having a temperature or pressure sensor could report the temperature or pressure of the item associated with the particular tag. Once a tag is affixed to a given item, it is read with a device typically referred to as a "reader," which sends out a certain excitation frequency that is detected by the tag, and then, when required, responded to by the tag. The reader can read data from a tag by detecting perturbations in the electric field caused by a tag transmission.

One variety of tags would be very simple. Such a simple tag would be idle when there is no reader field present, and when a reader field is asserted, then the tag transmits its data (e.g., item serial number, model number, etc.) continuously until the reader field is turned off. Alternatively, one might require a tag of greater functional capability. Creating a tag of greater functionality, yet limiting its production cost, generally implies the creation of a tag having minimum on-chip logic, and a reader with greater functional capability. In this manner, the reader can prompt different actions from the tag simply by sending different commands to the tag. This approach effectively yields a tag capable of executing more functions, prompted by different reader commands, with minimum cost of on-chip tag logic. Since the interface between a reader and a tag is usually air, it is very limiting. In other words, wireless communication between two elements such as a reader and a tag is relatively more difficult than communication between two other elements over an electrical conductor such as a wire. In light of the more challenging aspects of wireless communication, the communications link between a reader and a tag needs to be sophisticated enough to be able to pass commands back and forth between the two.

One possible manner of communicating with a tag would be to have a reader send actual commands to the tag. Such an approach would require complex tag circuitry to enable it to discern between an "empty" electromagnetic field, which is one devoid of any command for the tag other than a simple query for identification data from the tag, and a "loaded" electromagnetic field embedded with one or more commands for a tag. Moreover, different electromagnetic field strengths transmitted from a reader would necessitate the use of many high gain amplifiers on a tag to enable it to accurately detect commands on top of a carrier signal likely to be changing in orders of magnitude. Readers typically have high gain amplifiers, but placing such high gain amplifiers on a tag would require the tag to supply them with levels of power that a tag simply cannot deliver. Thus, if sending a variety of different commands to a tag is prohibitive because of tag power supply limitations, then a preferred communication technique would simply be to interrupt the electromagnetic field transmitted from the reader for a relatively short period of time in order to signal to the tag that it is then to commence a particular operation.

This interruption in the transmission of electromagnetic radiation from a reader to a tag is referred to as a "gap." In the simplest mode of operation, it is desirable that a tag be able to detect a single gap in the transmission from the reader in order to trigger a particular operation by the tag. However, in order to have a tag with greater operational capability, it must be able to detect multiple gaps in the electromagnetic field transmitted by the reader. More specifically, more capable tags will be able to recognize certain combinations of gaps established over certain time intervals, thereby triggering different operations from the tag. It is important to recognize that, in general, tags are powered only by the electromagnetic field inducing potential across the tag's internal coil, thereby producing current for the tag's internal logic. Now, it is also important to recognize that the internal tag circuitry has associated with it some capacitance capable of retaining some power for the tag logic. However, the power retaining capability of most tags is very limited, and therefor, it is necessary to refresh the tag's capacitance-retained power by recurring application of the reader's electromagnetic field. In order for a tag to be able to detect combinations of gaps, the reader's electromagnetic field must be applied, interrupted, and reapplied a number of times over particular time intervals. However, because the tag's capacitance-retained power supply must be regularly refreshed from the reader's electromagnetic field, the duration of any gap must be relatively short.

The previous discussion under the heading, "Description of the Related Art" is largely background information regarding certain aspects of the operation of a reader and a tag. Regarding the state of prior art tags, they detected gaps by determining when the potential at both ends of the tag's internal coil would be at or near chip ground. The term chip ground refers to a ground signal produced by the electronics on the IC die internal to the tag. More specifically, certain components of the tag's IC die process the signals coming from each end of the tag's coil in order to produce a ground signal for use by the rest of the internal tag circuitry. When prior art tags detected the condition where the potential at both ends of the tag's coil attained, or at least approached, chip ground at the same time, the tag circuitry detected a gap.

One problem with detecting this condition was that the coil voltages were measured relative to chip ground. The tag's internal circuitry must run off of some ground (i.e., chip ground) derived from the tag's coil, and that ground level depends on many factors. For example, when the tag is in a reader's electromagnetic field, the chip ground level is somewhat predictable because there is a rectifier in the tag's internal circuitry which references chip ground to the lower potential of the two coil terminals. Herein lies the problem. When the amplitude of the coil voltages goes to zero, the aforementioned rectifier essentially becomes an open circuit, and the coil is floating with respect to the chip ground. Of course, the capacitance of the tag's internal circuitry helps to maintain the chip ground signal; however, the reality of the situation is that when the reader's electromagnetic field is interrupted, and the coil voltages go to zero, the rectifier becomes an open circuit. Consequentially, the chip ground signal is too unpredictable to be effectively used as a reference to measure the potential of the coil terminals. As a result, the detection of a gap is hampered under the prior art approach.

Therefore, there existed a need to provide an improved tag capable of detecting a gap in a reader's electromagnetic field independent of the chip ground signal.

SUMMARY OF THE INVENTION

An object of the present invention is to provide an improved integrated circuit transponder device and an improved method of communication therefor.

Another object of the present invention is to provide an improved integrated circuit transponder device capable of detecting gaps in the transmission of an electromagnetic field in proximity thereto, thereby triggering the device into one or more operations.

Yet another object of the present invention is to provide an improved integrated circuit transponder device capable of detecting, independently of a ground signal for the device, when induced voltages on the ends of an internal coil are approximately equal over a period of time.

BRIEF DESCRIPTION OF THE PREFERRED EMBODIMENTS

According to one embodiment of the present invention, an integrated circuit transponder device is disclosed comprising, in combination, a single, externally wireless package enclosing an integrated circuit semiconductor chip, a coil within the package being selectively exposed to an electromagnetic field, and detection means on the integrated circuit semiconductor chip and being coupled to each end of the coil for detecting when voltages at each end of the coil are approximately equal over a period of time. The detection means, independent of a ground signal on the integrated circuit semiconductor chip, detects an interruption of transmission of the electromagnetic field. The device further includes a capacitor coupled in parallel to the coil. Additionally, the integrated circuit semiconductor chip includes a rectifier coupled to each end of the coil for rectifying signals from the coil, and the rectifier includes a pair of diodes and a pair of transistors. The detection means includes an exclusive NOR gate coupled to each end of the coil. Moreover, one end of the coil is input to a first pair of serially connected inverters having an output connected to a first input of the exclusive NOR gate, and another end of the coil is input to a second pair of serially connected inverters having an output connected to a second input of the exclusive NOR gate. The output of the exclusive NOR gate is input to a filter before being supplied to the rest of the device's circuitry.

According to another embodiment of the present invention, a method of operating an integrated circuit transponder device is disclosed comprising the steps of providing a single, externally wireless package enclosing an integrated circuit semiconductor chip, providing a coil within the package being selectively exposed to an electromagnetic field, and providing detection means on the integrated circuit semiconductor chip and being coupled to each end of the coil for detecting when voltages at each end of the coil are approximately equal over a period of time. The detection means, independent of a ground signal on the integrated circuit semiconductor chip, detects an interruption of transmission of the electromagnetic field. This method further includes the step of providing a capacitor coupled in parallel to the coil. The integrated circuit semiconductor chip includes a rectifier coupled to each end of the coil for rectifying signals from the coil, and the rectifier includes a pair of diodes and a pair of transistors. The step of providing the detection means includes the step of providing an exclusive NOR gate coupled to each end of the coil. Moreover, one end of the coil is input to a first pair of serially connected inverters having an output connected to a first input of the exclusive NOR gate, and another end of the coil is input to a second pair of serially connected inverters having an output connected to a second input of the exclusive NOR gate. Prior to being supplied to the remainder of the device's circuity, an output of the exclusive NOR gate is input to a filter.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 4:
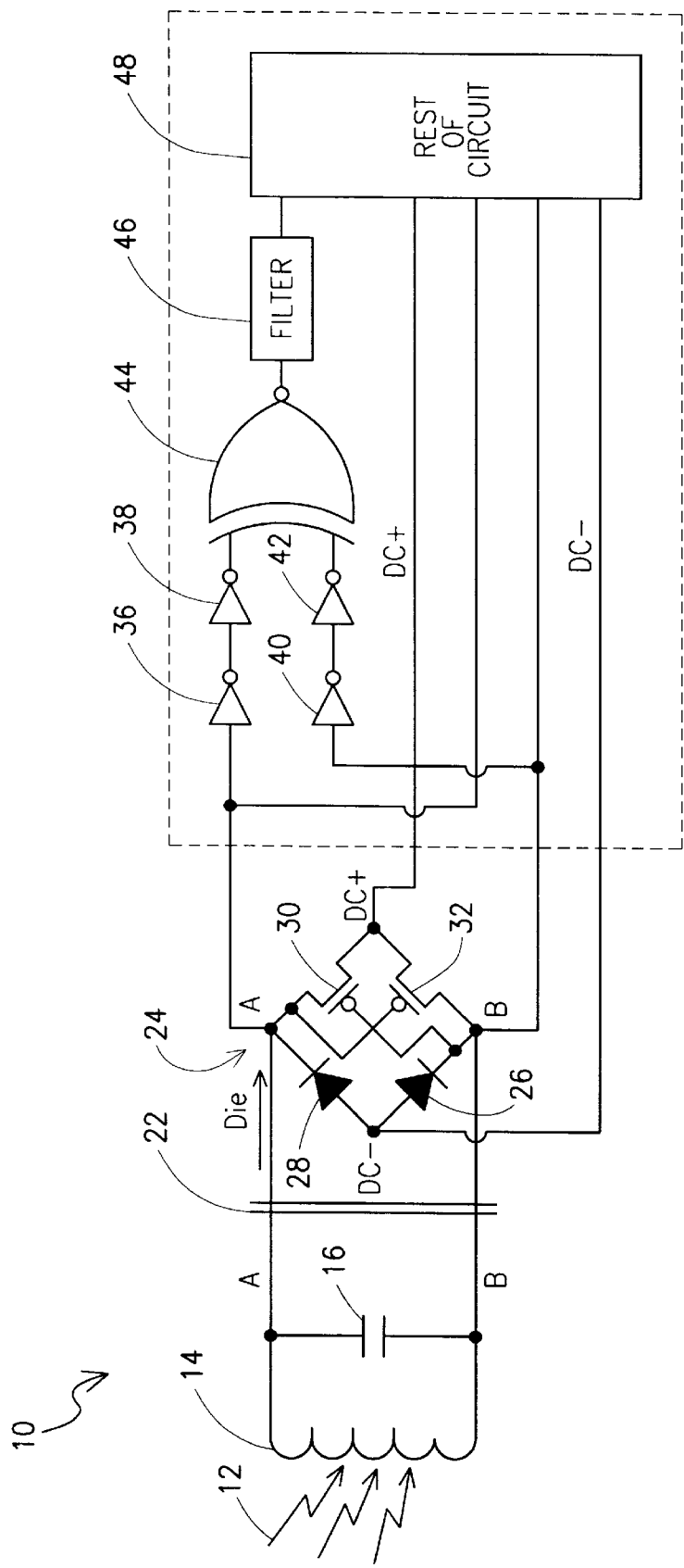
FIG. 4 is a simplified electrical schematic of the improved tag.

Referring to FIG. 4, an integrated circuit transponder device (hereafter more simply referred to as "tag") is shown and generally designated by reference number 10. The tag 10 is enclosed in a single package in a manner well known to those skilled in the art. The package is not explicitly shown in the Figure for clarity of presentation; however, the package would enclose all elements of the tag 10, and the package would be externally wireless. This means that the package would envelop every element in FIG. 4 except for element number 12, which will be discussed below. Note also that FIG. 4 shows two vertical lines labeled 22, which are not part of the tag 10. Rather, the lines 22 are shown to conceptually demarcate the Integrated Circuit (hereafter "IC") semiconductor chip of the tag 10 from the tag components distinct from the IC semiconductor chip. Those portions of the Figure shown to the right of vertical lines 22 comprise the die elements of the IC semiconductor chip, and the portions to the left of vertical lines 22 (except for element 12 which is not part of the tag 10) comprise tag elements not located on the tag's IC semiconductor chip. Summarizing for the sake of absolute clarity, all elements in FIG. 4 except those labelled 12 and 22 comprise the tag 10, and the tag elements located to the left of vertical lines 22 are not located on the tag's IC semiconductor chip, while those to the right of vertical lines 22 are part of the tag's IC semiconductor chip. Lastly, it should be pointed out that the particular details regarding the fabrication of a tag, such as tag 10 shown in FIG. 4, are more explicitly delineated in the related patent applications mentioned above.

Still with reference to FIG. 4, the tag 10 comprises, in combination, a single package (not explicitly shown) enclosing an IC semiconductor chip (i.e., that portion of tag 10 to the right of vertical lines 22), a coil 14 within the package being selectively exposed to an electromagnetic field 12, and a detection portion (to be discussed in detail below) on the IC semiconductor chip and being coupled to each end of the coil 14 for detecting when voltages at each end of the coil 14 are approximately equal over a period of time. The electromagnetic field 12 is generated by a device well known to those skilled in the art as a reader (not shown). The reader transmits the electromagnetic field 12 to penetrate the coil 14, and selective interruptions or gaps in the transmission of the electromagnetic field 12 are intended to be detected by the tag 10. A capacitor 16 is coupled in parallel to the coil 14. Penetration of the electromagnetic field 12 through the coil 14 will induce coil voltage having a resonant frequency that is the result of the values of coil 14 inductance and capacitor 16 capacitance. Thus, the capacitor 16 is matched with the coil 14 in a manner well known to those skilled in the art to develop the desired resonant frequency for the tag 10.

Two induced voltages A and B taken off the ends of the coil 14 are supplied on chip (i.e., to the right of vertical lines 22) to a rectifier 24. The rectifier 24 includes a pair of diodes 26 and 28 and a pair of PMOS transistors 30 and 32 coupled to perform the desired rectification of signals A and B. Note that other types of rectifiers well known to those skilled in the art could be implemented, if desired. The rectifier 24 here has the anode junctions of the diodes 26 and 28 tied together at a node providing a signal DC−, and the drain junctions of PMOS transistors 30 and 32 are tied together at a node providing a signal DC+. Note that the signals DC− and DC+ are provided to the block 48, labeled "Rest of Circuit." Block 48 represents circuitry performing tag functions, of which there are many possibilities now known or to be learned by those skilled in the art in the future. DC+ and DC− represent a power and ground supply for block 48, respectively. Returning to the rectifier 24, the source junction of PMOS transistor 30 and the cathode junction of diode 28 are tied together at a node supplied with the signal A from one end of the coil 14. Similarly, the source junction of PMOS transistor 32 and the cathode junction of diode 26 are tied together at a node supplied with the signal B from another end of the coil 14. Additionally, the gate junctions of PMOS transistors 30 and 32 are tied to nodes having signals B and A, respectively. With that structure for rectifier 24, it provides power supply and ground signals, DC+ and DC−, respectively, to block 48. It should also be pointed out that the ends of the coil 14 are coupled to the block 48 to provide induced signals A and B to the block 48, which includes circuitry well known to those skilled in the art to produce a clock signal for block 48 from the processing of signals A and B.

Still referring to FIG. 4, the ends of the coil 14 are coupled to the detection portion to provide signals A and B thereto. The detection portion includes an exclusive NOR gate 44 coupled to each end of the coil 14 through two pairs of serially connected inverters 36–42. In particular, one end of the coil 14 is coupled to inverter 36 to provide signal A to its input, and its output feeds the input of serially connected inverter 38, which has its output connected to an input junction for exclusive NOR gate 44. Similarly, another end of the coil 14 is coupled to inverter 40 to provide signal B to its input, and its output feeds the input of serially connected inverter 42, which has its output connected to another input junction for exclusive NOR gate 44. The inverters 36 and 40 are level shifting inverters well known to those skilled in the art. They simply downshift the input voltages of signals A and B down to a lower level for processing by the exclusive NOR gate 44, a filter 46, and the remainder of the tag's circuitry in block 48. The inverters 38 and 42 are non-level shifting inverters (i.e., generic inverters). They simply ensure that the output of each serially connected inverter chain has the same polarity as its respective input; however, as the detection portion implements an exclusive NOR gate 44, it will become apparent later in the section discussing the operation of the tag 10 that the inverters 38 and 42 could be removed if desired while maintaining the same operation of the tag 10. The output of the exclusive NOR gate 44 is input to a filter 46 such as an RC-type filter well known to those skilled in the art, and the output of the filter 46 is delivered to the remaining tag circuitry in block 48.

OPERATION

Recalling from the earlier discussion with respect to FIG. 4, a capacitor 16 is selected with a value of capacitance that taken with the inductance associated with the coil 14 results in obtaining the desired resonance frequency for the tag 10. In the current embodiment of the tag 10, that resonant frequency is generally chosen to fall within the range of 125 KHz to 13.5 MHz; however, those skilled in the art recognize that virtually any resonant frequency desired can be attained by an appropriate combination of the coil 14 and capacitor 16. Regarding block 48 from FIG. 4, it should be pointed out that there are a variety of tags capable of performing a variety of different functions. A few examples of the potential uses for tags include pet identification tags, personal identification tags, and luggage identification tags.

Thus, one can see that one function of a tag is to provide a method of identifying the object or person associated with a particular tag. Another functional aspect of tags is that they are contactless, meaning that no external conductors are required for the tag to be in communication with an external system component such as a reader. That is, a reader provides power to a tag, and it communicates with a tag, without the use of interconnecting wires. Yet another feature of tags is what those skilled in the art refer to as the "anti-collision" function. This function is useful under the following circumstances. Suppose one has a number of tags, each being exposed to the electromagnetic field 12 being generated by a reader; however, the reader is only interested in communicating with a particular "target" tag in the group. The "anti-collision" feature permits non-targeted tags to remain within the reader's field 12 without responding to the reader's prompts, thereby permitting the non-targeted tags to maintain their field-induced power, while the reader communicates with the targeted tag. These and other tag features can be implemented, in any one of a number of manners well known to those skilled in the art, with logic in the block labeled 48. The particular circuitry required to perform such features is not shown in block 48 of the tag 10 as they are not the focus of this discussion. Rather, the focus here is to disclose an improved tag 10 and an improved method of communication therefor with a reader, centering on the tag 10 detecting a gap in the reader's electromagnetic field 12.

Figure 1:
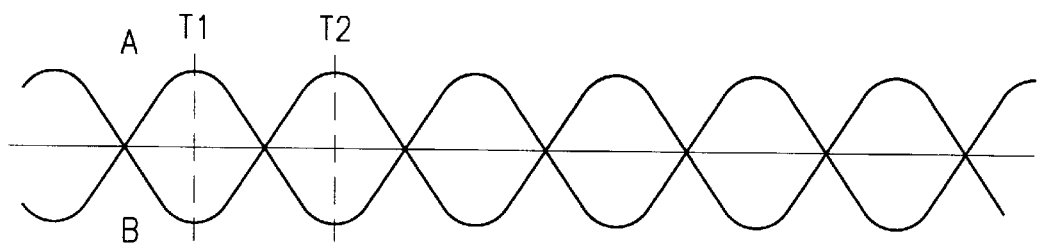
FIG. 1 is a timing diagram showing the induced voltages on the tag's coil.

Referring now to FIG. 1, two signals A and B are shown. When the reader (not shown) transmits an electromagnetic field 12 (see also FIG. 4 regarding this discussion) that penetrates the coil 14 in tag 10, a potential is induced in the coil 14, and the voltage signals from the ends of the coil 14 are represented by signals A and B. The signals are generally of opposing polarity, as can be seen by viewing points in time labelled $T_1$ and $T_2$. At time $T_1$, signal A is at a maximum positive potential, while signal B is at a maximum negative potential. Conversely, at time $T_2$, signal B is at a maximum positive potential, while signal A is at a maximum negative potential.

Figure 2:
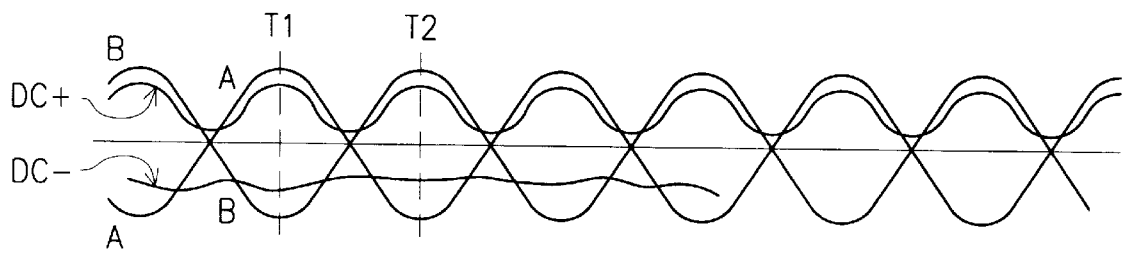
FIG. 2 is a timing diagram showing the induced voltages on the tag's coil, and the output of the tag's rectifier.

Referring to FIG. 2, the two signals A and B from FIG. 1 are again shown, as well as additional signals DC+ and DC−. The signals A and B are, as before, the induced voltage signals from the ends of the coil 14 (see also FIG. 4 regarding this discussion). Signals DC+ and DC− are produced from the application of signals A and B to the rectifier 24. The rectifier 24 operates to produce DC+ such that it follows the higher of signal A or signal B. Also, note that the signal DC+ is shown separated from the higher of signal A or signal B; however, this separation is exaggerated for the sake of visual clarity. In practice, DC+ nearly identically follows the higher of signals A or B.

Still regarding the operation of rectifier 24, at time $T_1$, signal A is higher than signal B. Also, the gate of PMOS transistor 30 is tied to signal B, while its source is tied to signal A. Whenever, the gate of a P-channel MOS transistor is lower than its source or drain, it will be on. Accordingly, PMOS transistor 30 will be on at time $T_1$, while PMOS transistor 32 will be off since its gate, coupled to signal A, is higher than its source coupled to signal B. Thus, at time $T_1$, the current associated with signal A will conduct through PMOS transistor 30 to the DC+ node, and the DC+ signal will follow signal A. Conversely, at time $T_2$, signal B is higher than signal A, and the gate of PMOS transistor 32 is tied to signal A, while its source is tied to signal B. Again, whenever the gate of a P-channel MOS transistor is lower than its source or drain, it will be on. Accordingly, PMOS transistor 32 will be on at time $T_2$, while PMOS transistor 30 will be off since its gate, coupled to signal B, is higher than its source coupled to signal A. Thus, at time $T_2$, the current associated with signal B will conduct through PMOS transistor 32 to the DC+ node, and the DC+ signal will follow signal B. In this manner then, the signal DC+ will approximately follow the higher of signals A and B. Ultimately, the signal DC+ is sufficient to provide a DC power supply for the circuitry of block 48.

Still referring to FIG. 2, at time $T_1$, signal A is greater than B. If signal B is also low relative to DC− then diode 26 (again see FIG. 4 regarding this discussion) will be forward biased and the signal DC− will be drawn down toward the level of signal B (i.e., it will be drawn down to a diode drop above B); however, signal A won't have any effect since diode 28 will be reversed biased. DC− will approximately follow a diode drop above the lowest potential between signals A and B. Thus proceeding forward from $T_1$, signal DC− will follow signal B upward; this is because of the coupling capacitance of diode 26. Immediately following the midway point between times $T_1$ and $T_2$, signal A becomes lower than signal B. Soon after that point, the diodes 26 and 28 switch their biases between forward and reverse. Specifically, approaching time $T_2$, signal B is greater than A. Then, if signal A is low relative to DC−, then diode 28 will be forward biased and the signal DC− will be drawn down toward the level of signal A (i.e., it will be drawn down to a diode drop above A); however, signal B won't have any effect since diode 26 will be reversed biased. In this manner, the signal DC− will approximately follow, at a diode drop above, the lower of signals A and B. The signal DC− is sufficient to provide a ground supply for the circuitry of block 48.

Before moving onto the operation of the detection portion of the tag 10, it is important to note again that the tag 10 contains no internal power supply and no external conductors either for delivering power to the tag 10 or permitting the tag 10 to communicate with outside devices via such direct conductors. Yet the tag 10 has power and it can communicate with outside devices such as a reader. The tag 10 has power because it produces its internal operating power, DC+ and DC−, from the voltages, A and B, induced on its coil 14 when the reader transmits an electromagnetic field 12. Additionally, the tag 10 has some internal capacitance permitting it to retain, for a certain period of time, its induced power. Moreover, the tag 10 can communicate with external devices like the reader without the use of interconnecting wires, and this is because the tag 10 uses its coil 14 essentially as an antenna to both receive and transmit electromagnetic signals carrying information. Lastly, it should be mentioned again that the signals A and B are directly input to the block 48, which processes these signals in a manner well known to those skilled in the art in order to provide a clock signal for the circuity in block 48.

Figure 3:
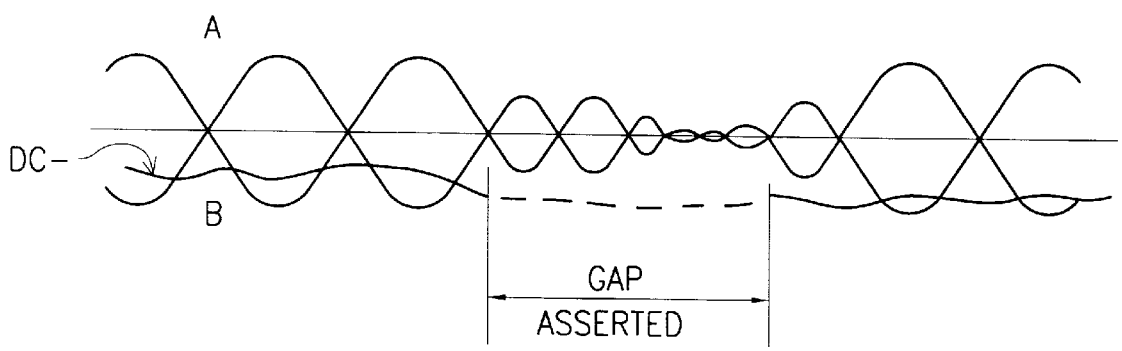
FIG. 3 is a timing diagram showing the effect on the induced voltages in the tag's coil and on the lower voltage supplied from the rectifier caused by the assertion of a gap in the electromagnetic field from a reader.

Referring to FIG. 3, signals A, B, and DC− are shown, and they are produced as discussed above. In FIG. 3 however, the electromagnetic field 12 coming from the reader has been momentarily interrupted to form a gap in field transmission. The left edge of the region labeled "gap asserted" indicates the time at which the gap in field transmission begins, while the right edge of this region delineates that point in time when the field 12 from the reader returns. Note that when the gap commences that the signals A and B do not instantaneously go to zero. Similarly, when the reader's field transmission recommences, the signals A and B do not immediately reach their maximum values. The lag times in the fall and rise of signals A and B are primarily attributable to the capacitor 16 and other impedance looking into the tag 10. Regardless of the delay in the decay of signals A and B, they ultimately steady out at the same value, which is indicative of a gap in the field 12. However, to properly detect this steady-state condition of signals A and B, one generally requires a reference signal, namely ground or DC−. This presented a problem.

In particular, during the field gap, signals A and B will eventually approximately equal each other. At or near this point in time, there is no potential difference between signals A and B across the rectifier 24. Then, the rectifier 24 is essentially an open circuit because when signals A and B are equal, or approximately so, neither diode 26 nor diode 28 will be forward biased, and there will be no PMOS transistor (30 or 32) gates lower than their respective sources or drains, so no current will flow through rectifier 24. At this point, DC− or ground is no longer supplied to block 48. Of course, as mentioned before, block 48 has some internal capacitance permitting it to retain some amount of power, DC+, and ground DC−. In practice however, predicting the level of ground or DC− when the rectifier 24 is an open circuit is very difficult, and accordingly determining when signals A and B are both at ground (i.e., detecting a gap) is enigmatic since the level of ground is unpredictable at this time. Therefor, there was a need to develop a tag 10 capable of detecting a gap in the reader's electromagnetic field 12, independent of a ground signal on the integrated circuit semiconductor chip of the tag 10. The solution lies in the incorporation of the detection portion to the tag 10.

Referring to FIG. 4, the signals A and B are input to level shifting inverters 36 and 40 that shift the voltage level of their respective inputs to a high or low level usable by the downstream circuitry. More specifically, if signals A and B are above a certain magnitude, then the output of level shifting inverters 36 and 40 will be at the high level usable by downstream circuitry, but if signals A and B are below a certain magnitude, then the output of level shifting inverters 36 and 40 will be at the low level usable by the downstream circuitry. An important point to note is that when there is a gap in the reader's electromagnetic field 12, signals A and B will ultimately reach approximately the same level for some period of time (see FIG. 3). At that point in time, the outputs of level shifting inverters 36 and 40 will be the same—either both high or low. The outputs of level shifting inverters 36 and 40 are fed through inverters 38 and 42, respectively, to arrive at the same polarity of signals leaving inverters 38 and 42 as was entering corresponding level shifting inverters 36 and 40.

The outputs of inverters 38 and 42 are input to exclusive NOR gate 44 which will output a high signal when its input signals are the same, and a low signal when different. This means that the exclusive NOR gate 44 outputs a high signal when the signals A and B are the same, or nearly so, during a gap in the field 12. Simply put, the exclusive NOR gate 44 outputs a high signal when a gap is detected. Those skilled in the art recognize that because an exclusive NOR gate 44 is used, inverters 38 and 42 may be omitted from the tag 10, if desired since the exclusive NOR gate 44 would still output a high signal in the presence of a gap. The filter 46 comprises an RC type filter. It is necessary because signals A and B do equal each other for a very short period of time when they cross (see FIGS. 1–3). The filter 46 prevents any high signal from the output of the exclusive NOR gate 44 passing to block 48 at these times; however, during a gap in the field 12, signals A and B equal each other for a longer period of time. In this later case, a high output from the exclusive NOR gate 44 will not be filtered by filter 46, and a high signal will continue on to the circuitry in block 48, thereby indicating the presence of a gap in the transmission of the electromagnetic field 12 from the reader. In response, circuitry well known to those skilled in the art within block 48 performs the prompted tag operation. Note also that the tag 10 could detect series or combinations of gaps in the field 12 in order to trigger different responses from the tag 10. Transmissions from the tag 10 back to the reader are initiated by circuitry within block 48. There are a number of different ways to initiate such transmissions, all well known to those skilled in the art. Lastly, the tag's transmission data coming from block 48 is routed through other lines (not shown) to the ends of the coil 14, acting at this stage as a transmitting antenna, to send an electromagnetic transmission to the reader.

Although the invention has been particularly shown and described with reference to a preferred embodiment thereof, it will be understood by those skilled in the art that changes in form and detail may be made therein without departing from the spirit and scope of the invention. For example, an exclusive NOR gate 44 is used here to detect a gap in the reader's electromagnetic field 12; however, if desired, one could modify the tag 10 to implement an exclusive OR gate, or the like.

What is claimed is:

1. An integrated circuit transponder device comprising, in combination:

a single package enclosing an integrated circuit semiconductor chip;

a coil within said package being selectively exposed to an electromagetic filed; and detection means on said integrated circuit semiconductor chip and being coupled to each end of said coil for detecting when voltages at each end of said coil are approximately equal over a period of time, said detection means includes an exclusive NOR gate coupled to each end of said coil;

wherein one end of said coil is input to a first pair of serially connected inverters having an output connected to a first input of said exclusive NOR gate, and wherein another end of said coil is input to a second pair of serially connected inverters having an output connected to a second input of said exclusive NOR gate.

2. A method of operating an integrated circuit transponder device comprising the steps of:

providing a single package enclosing an integrated circuit semiconductor chip;

providing a coil within said package being selectively exposed to an electromagetic field; and providing detection means on said integrated circuit semiconductor chip and being coupled to each end of said coil for detecting when voltages at each end of said coil are approximately equal over a period of time, said step of providing said detection means includes the step of providing an exclusive NOR gate coupled to each end of said coil;

wherein one end of said coil is input to a first pair of serially connected inverters having an output connected to a first input of said exclusive NOR gate, and wherein another end of said coil is input to a second pair of serially connected inverters having an output connected to a second pair of said exclusive NOR gate.

* * * * *